United States Patent
Hitz et al.

(10) Patent No.: US 7,810,873 B2
(45) Date of Patent: Oct. 12, 2010

(54) DASHBOARD SUPPORT

(75) Inventors: Andreas Hitz, Erwitte (DE); Benjamin Viallard, Versailles (FR)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 12/186,931

(22) Filed: Aug. 6, 2008

(65) Prior Publication Data

US 2009/0140553 A1 Jun. 4, 2009

(30) Foreign Application Priority Data

Aug. 6, 2007 (DE) .................. 10 2007 036 918

(51) Int. Cl.
*B60J 7/00* (2006.01)
(52) U.S. Cl. ............... 296/193.02; 296/208; 296/70
(58) Field of Classification Search ............ 296/193.02, 296/208, 70
See application file for complete search history.

(56) References Cited

U.S. PATENT DOCUMENTS 6,668,513 B2 * 12/2003 Roberts et al. .............. 296/205
6,834,913 B2 * 12/2004 Reed et al. ................... 296/208
7,125,466 B2 * 10/2006 Cooper et al. ........... 156/244.14

FOREIGN PATENT DOCUMENTS

DE 299 16 467 12/1999

* cited by examiner

*Primary Examiner*—Joseph D Pape
(74) *Attorney, Agent, or Firm*—Henry M. Feiereisen; Ursula B. Day

(57) ABSTRACT

A dashboard support extending between the A-pillars of a motor vehicle includes a passenger-side beam member constructed to suit a load exposure on a passenger side, a driver-side beam member which is constructed to suit a load exposure on a driver side and connected to the passenger-side beam member; and an air guiding channel which is made of plastic and arranged in the driver-side beam member. The air guiding channel is supported on the inside by the driver-side beam member so as to be aligned in its three rotary degrees of freedom and its translational degrees of freedom in travel direction and vertical direction. The air guiding channel has a sidewall which is formed, for securement in a direction transversely to the travel direction, with an outwardly directed protuberance for engagement in a receiving member in the driver-side beam member when the air guiding channel is displaced transversely to the travel direction.

8 Claims, 1 Drawing Sheet

DASHBOARD SUPPORT

CROSS-REFERENCES TO RELATED APPLICATIONS

This application claims the priority of German Patent Application, Serial No. 10 2007 036 918.4, filed Aug. 6, 2007, pursuant to 35 U.S.C. 119(a)-(d), the content of which is incorporated herein by reference in its entirety as if fully set forth herein.

BACKGROUND OF THE INVENTION

The present invention relates, in general, to a dashboard support for a motor vehicle.

Nothing in the following discussion of the state of the art is to be construed as an admission of prior art.

A dashboard support extends between the A-pillars of a motor vehicle, such as a passenger car, and is also called "cross member". The dashboard support is typically made of tubes, profiled elements, or pressed shells. Various mounts or castings are hereby attached to the dashboard support in order to be able to link further functional components to the dashboard support, such as, for example, airbag, air conditioning unit, or bracket for the steering. In addition, the dashboard support is required to meet vibration standards and stringent static demands to sufficiently stiffen the passenger cell.

German utility model no. DE 299 16 467 describes a dashboard support which includes a support beam with integrated air cooling. The support beam is divided into interconnected beam members which suit the load exposure on the driver side and the passenger side, respectively, with the driver-side beam member having an air guiding channel. Different cross section profiles and material pairs are therefore possible. An air gap is provided between the air guiding channel and the beam member and is bridged by several fixing tabs which are directed outwards and spaced about the periphery of the air guiding channel. The fixing tabs align the air guiding channel inside the beam member in a rattling-free manner. The fixing tabs can be configured as nubs to provide an air gap between the beam member and the air guiding channel. Nubs or fixing tabs do not allow a securement of the air guiding channel transversely to the travel direction.

A proper positioning of an air guiding channel in a dashboard support requires a correct securement in all of its degrees of freedom. The six degrees of freedom involve three translational and three rotary degrees of freedom in the Cartesian coordinate system. A correct securement is absolutely required in order to be able to connect an air supply to one end of the air guiding channel and to be able to correctly mount the so-called upper passenger compartment outlet. on the other end. The precise alignment of the air guiding channel is also necessary to prevent flow-generated noise which should be avoided in particular at the attachment sites of the air guiding channel because the lateral offset between adjacent components is responsible for interfering turbulences in the flow channel.

The air guiding channel can be brought into spotwise contact along its outer surface area with the inside wall of the dashboard support for alignment in five of six degrees of freedom. Restriction of the sixth degree of freedom i.e. the translation in +Y/−Y direction, i.e. transversely to the travel direction and in longitudinal direction of the cross member, respectively, can be realized by positioning an air outlet of the air guiding channel upon a respective opening in the dashboard support. This is time-consuming and costly as the installation requires a threading of the air guiding channel with its air outlet in the opening.

It would therefore be desirable and advantageous to provide an improved dashboard support to obviate prior art shortcomings and to allow easy and cost-efficient installation.

SUMMARY OF THE INVENTION

According to one aspect of the present invention, a dashboard support, extending between the A-pillars of a motor vehicle, includes a passenger-side beam member constructed to suit a load exposure on a passenger side, a driver-side beam member which is constructed to suit a load exposure on a driver side and connected to the passenger-side beam member, and an air guiding channel made of plastic and arranged in the driver-side beam member, wherein the air guiding channel is supported on the inside by the driver-side beam member so as to be aligned in its three rotary degrees of freedom and its translational degrees of freedom in travel direction and vertical direction, wherein the air guiding channel has a sidewall which is formed, for securement in a direction transversely to the travel direction, with an outwardly directed protuberance for engagement in a receiving member in the driver-side beam member when the air guiding channel is displaced transversely to the travel direction.

The present invention resolves prior art problems by forming a protuberance in the sidewall of the air guiding channel, thereby preventing a material accumulation in the locking area. This saves material and weight. In addition, as the outwardly directed protuberance is formed in the sidewall and may have the configuration of a spherical shell or nub, it is easy and cost-effectively to make. This type of locking mechanism allows a locking of the air guiding channel when reaching its predefined end position within the driver-side beam member of the dashboard support.

The counterpiece to the protuberance is the receiving member in the beam member. The receiving member may be an opening, or a through-passage, i.e. an opening with collar. It is also possible to realize the receiving member as an outward projection in the beam member, thus requiring the beam member to undergo only a simple forming process for realizing the locking, and there is no need for providing recesses or openings.

According to another feature of the present invention, the beam member may be formed with a support platform directed to the air guiding channel for disposition of the receiving member. The support platform projects effectively inwardly into the beam member and may be formed as embossment of the beam member. In other words, the sidewall of the beam member in the area of the support platform is shaped to eliminate the need for addition material to form the support platform.

According to another feature of the present invention, the support platform may have a slanted run-on surface for the protuberance in the air guiding channel. This simplifies installation. The protuberance thus moves on the run-on surface, when the air guiding channel is displaced, and ultimately snaps into the receiving member. The air guiding channel is locked in this position with the beam member and securely restrained against a shift in +Y and −Y directions. Moreover, the air guiding channel is supported by the support platform, when installed, thereby providing additional securement transversely to the +Y and −Y directions.

A desired form-fitting engagement is further enhanced when suiting the receiving member to the geometry of the protuberance. Suitably, the receiving member has a cross section which coincides with the protuberance. As a result, a reliable form-fitting engagement of the air guiding channel with the beam member is ensured. This is further enhanced by the fact that the air guiding channel is made of plastic and thus flexible to inevitably react to encountered normal forces, i.e. the elasticity of the plastics used for making the air guiding channel ensures that the air guiding channel is maintained under tension which is necessary to push the protuberance into the receiving member of the beam member. As a result, also a force-locking engagement is established in addition to the form-fitting engagement between the air guiding channel and the beam member so that the air guiding channel is also blocked in its sixth degree of freedom.

According to another feature of the present invention, the protuberance is defined by a height which may be smaller than or equal to a height of the support platform so that the protuberance is prevented from extending beyond an outer side of the beam member, when the protuberance is locked in the receiving member. As a result, the air guiding channel is completely arranged within the beam member, including all components that implement proper positioning and securement. There are no part of the air guiding channel that project out of the beam member, thereby eliminating the need for more space outside the dashboard support for realizing the locking between the air guiding channel and the beam member. When the air guiding channel is being removed from the beam member, the type of connection between the protuberance and the receiving member is easy to recognize, especially when the receiving member is configured as through-passage so that by pushing the protuberance inwards, the form-fit between the parts is no longer effective, thereby allowing easy dismantling of the dashboard support.

It will be understood by persons skilled in the art that it is, of course, within the scope of the invention to provide several protuberances and several receiving members in order to securely fix the air guiding channel in place.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
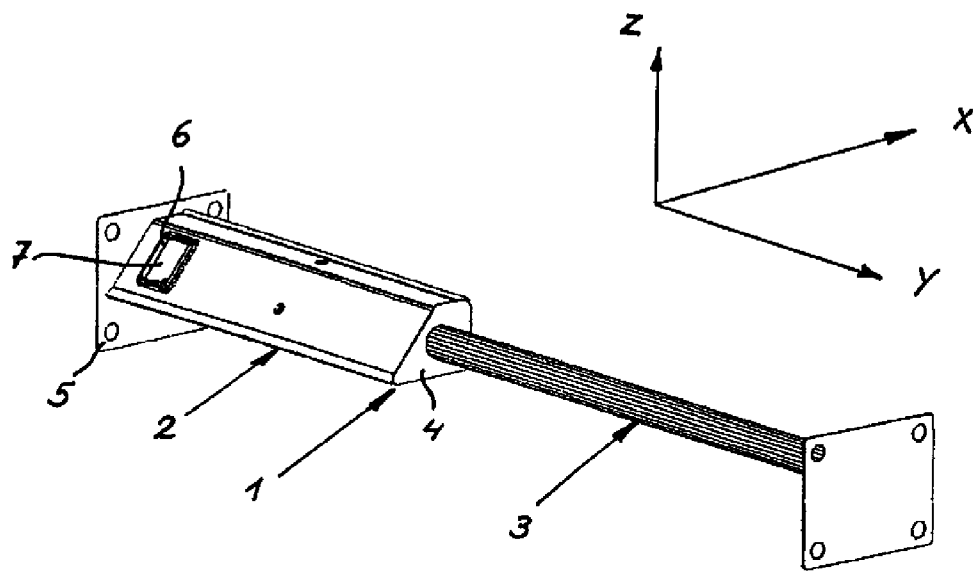
FIG. 1 is a perspective illustration of a dashboard support according to the present invention with driver-side and passenger-side beam members.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of a dashboard support according to the present invention, generally designated by reference numeral 1 and extending between unillustrated A pillars of a motor vehicle such as a passenger car. The dashboard support 1 has a driver-side beam member 2 and a passenger-side beam member 3. The passenger-side beam member 3 is a tubular member which is suited solely to cope with loads to which the passenger side is exposed. The driver-side beam member 2 has a box profile which has opposite ends, with one end connected via a flange 4 to the passenger-side beam member 3, and with the other end connected via a flange 5 to the A-pillar (not shown).

Figure 2:
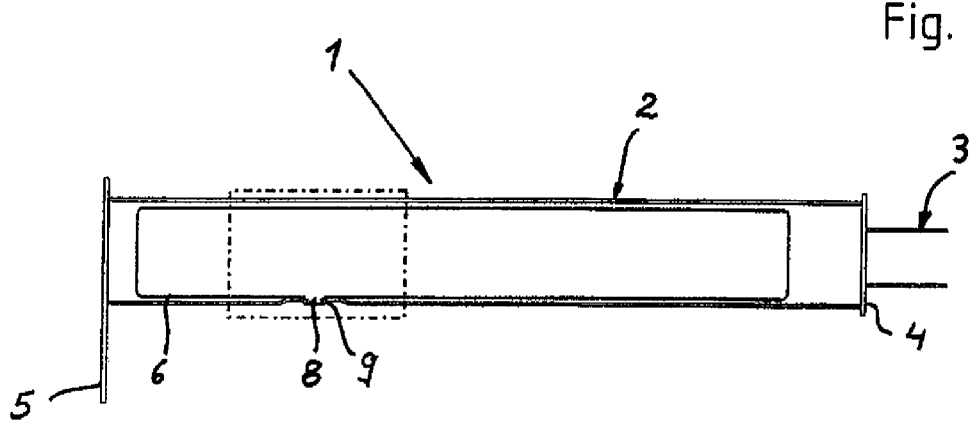
FIG. 2 is a longitudinal section of the driver-side beam member of FIG. 1.

As shown in FIG. 2, which is a longitudinal section of the driver-side beam member 2, the driver-side beam member 2 accommodates an air guiding channel 6 of plastic material. The air guiding channel 6 conducts air from an air conditioning unit, arranged in midsection of the dashboard support 1, via an air inlet in the air guiding channel 6 to an air outlet 7 thereof which is arranged adjacent to the driver-side A-pillar on the side opposite to the air inlet. Respective ports for the air inlet and air outlet are arranged in the driver-side beam member 2.

Figure 3:
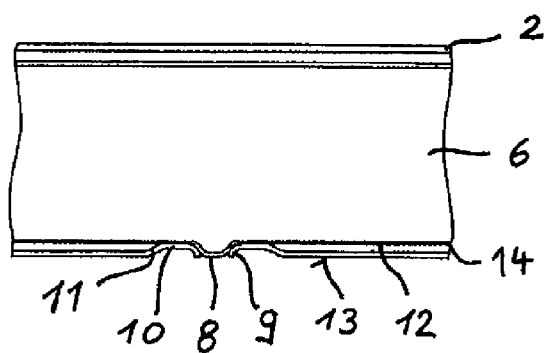
FIG. 3 is an enlarged detailed view of the area encircled in dash dot lines in FIG. 2.

FIG. 3 shows an enlarged detailed view of the area encircled in dash dot lines in FIG. 2, and it can be seen that the air guiding channel 6 has a lower sidewall 12 which is formed with an outwardly directed protuberance 8 for engagement in a receiving member 9 in the beam member 2. The term "lower" relates hereby to the drawing plane of FIG. 3. The receiving member 9 is configured as through-passage, i.e. an opening with outwardly projecting collar. The protuberance 8 is of general cup shape or nub shape and has dimensions which are suited to the diameter of the receiving member 9 so that the protuberance 8 bears in the receiving member 9 in a formfitting manner. Although not shown in detail, the air guiding channel 6 applies as a result of the elasticity of the used plastic material a spring force which acts on the protuberance 8 so that the protuberance 8 is urged into engagement in the complementary receiving member 9 with a force.

The receiving member 9 is formed in a support platform 10 which is realized by an embossment in the beam member 2 in the direction of the air guiding channel 6. The support platform 10 encloses the receiving member 9, i.e. the through-passage, in the form of a ring. The receiving member 9 is thus arranged in midsection in the support platform 10. The support platform 10 includes a slanted run-on surface 11 on which the protuberance 8 is moved during installation and displaced radially inwards in opposition to the rebound forces of the used plastic material. Shortly before reaching the end position, the protuberance 8 snaps into the receiving member 9 so that the air guiding channel 6 is locked with the receiving member 9. In this position, the support platform 10 bears upon the air guiding channel 6 so that an air gap 14 is formed between the air guiding channel 6 and the beam member 2 in the regions outside the support platform 10.

It will be appreciated by persons skilled in the art that the air guiding channel 6 is, of course, additionally secured in place on the inner sides of the beam member 2 by further supports which do not appear in the foregoing Figures, but are provided to secure the air guiding channel 6 with respect to all degrees of freedom. However, these supports are not part of the invention, and have been omitted from the Figures for the sake of simplicity.

As can be seen from FIG. 3, the protuberance 8 does not extend beyond the outside 13 of the beam member 2 in the locked state because the protuberance 8 has a height which is smaller or equal to the height of the support platform 10. In this way, the air guiding channel 6 is completely housed within the beam member 2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A dashboard support, extending between the A-pillars of a motor vehicle, comprising:
   a passenger-side beam member constructed to suit a load exposure on a passenger side;
   a driver-side beam member which is constructed to suit a load exposure on a driver side and connected to the passenger-side beam member, said driver-side beam member including a receiving member; and
   an air guiding channel made of plastic and arranged in the driver-side beam member, said air guiding channel being supported by the driver-side beam member so as to be aligned in its three rotary degrees of freedom and its translational degrees of freedom in travel direction and vertical direction, wherein the air guiding channel has a sidewall which is formed, for securement in a direction transversely to the travel direction, with an outwardly directed protuberance for engagement in the receiving member in the driver-side beam member when the air guiding channel is displaced transversely to the travel direction,
   wherein the driver-side beam member is formed with a support platform directed to the air guiding channel, said receiving member being arranged in the support platform,
   wherein the protuberance is defined by a height which is smaller than or equal to a height of the support platform so that the protuberance is prevented from extending beyond an outer side of the driver-side beam member, when the protuberance is locked in the receiving member, and
   wherein the receiving member is an outward projection in the driver-side beam member.

2. The dashboard support of claim 1, wherein the receiving member is an opening in the driver-side beam member.

3. The dashboard support of claim 1, wherein the receiving member is a through-passage in the driver-side beam member.

4. The dashboard support of claim 1, wherein the support platform is an embossment in the driver-side beam member.

5. The dashboard support of claim 1, wherein the support platform has a slanted run-on surface for the protuberance in the air guiding channel.

6. The dashboard support of claim 1, wherein the support platform supports the air guiding channel, when installed.

7. The dashboard support of claim 1, wherein the protuberance is formed in the shape of a spherical shell or nub.

8. A dashboard support extending between the A-pillars of a motor vehicle, comprising:
   a beam having a receiving member; and
   an air guiding channel made of plastic and arranged in the beam, said air guiding channel having a sidewall which is formed with an outwardly directed protuberance for engagement in the receiving member in the beam for securing the air guiding channel transversely to a travel direction,
   wherein the beam is formed with a support platform directed to the air guiding channel, said receiving member being arranged in the support platform,
   wherein the protuberance is defined by a height which is smaller than or equal to a height of the support platform so that the protuberance is prevented from extending beyond an outer side of the beam, when the protuberance is locked in the receiving member, and
   wherein the receiving member is an outward projection in the beam.

\* \* \* \* \*